(12) United States Patent
Antinori et al.

(10) Patent No.: US 12,535,998 B2
(45) Date of Patent: Jan. 27, 2026

(54) DYNAMIC IMPORTATION OF EXTERNAL DEPENDENCY INFORMATION TO SUPPORT AUTOCOMPLETION IN AN INTERACTIVE DEVELOPMENT ENVIRONMENT

(71) Applicant: Red Hat, Inc., Raleigh, NC (US)

(72) Inventors: Paolo Antinori, Milan (IT); Eric P. Wittmann, Hartford, CT (US)

(73) Assignee: Red Hat, Inc., Raleigh, NC (US)

( * ) Notice: Subject to any disclaimer, the term of this patent is extended or adjusted under 35 U.S.C. 154(b) by 359 days.

(21) Appl. No.: 17/704,705

(22) Filed: Mar. 25, 2022

(65) Prior Publication Data
US 2023/0305817 A1    Sep. 28, 2023

(51) Int. Cl.
G06F 8/34    (2018.01)
G06F 8/71    (2018.01)

(52) U.S. Cl.
CPC . *G06F 8/34* (2013.01); *G06F 8/71* (2013.01)

(58) Field of Classification Search
CPC ..... G06F 8/34; G06F 8/71; G06F 8/33; G06F 8/433; G06N 20/00
See application file for complete search history.

(56) References Cited

U.S. PATENT DOCUMENTS

| | | | |
|---|---|---|---|
| 8,291,079 B1 | 10/2012 | Colton et al. | |
| 9,785,452 B2 | 10/2017 | Nandagopal et al. | |
| 9,841,982 B2 | 12/2017 | Petrovicky et al. | |
| 10,496,386 B1 * | 12/2019 | Ho | G06F 9/45508 |
| 10,983,770 B2 * | 4/2021 | Strimpel | G06F 8/433 |
| 2015/0363195 A1 * | 12/2015 | Schlueter | G06F 8/60 717/121 |
| 2018/0210866 A1 * | 7/2018 | Grigoryan | G06F 16/95 |
| 2019/0188010 A1 * | 6/2019 | Stockert | G06F 8/71 |
| 2019/0384581 A1 * | 12/2019 | Liu | G06Q 10/103 |
| 2020/0272440 A1 * | 8/2020 | Burgazzoli | G06F 8/36 |

(Continued)

FOREIGN PATENT DOCUMENTS

CN    111880786 A    11/2020

OTHER PUBLICATIONS

Author Unknown, "Plugin-Transform-Runtime," Babel, accessed Nov. 15, 2021 from https://babeljs.io/docs/en/babel-plugin-transform-runtime, 11 pages.

(Continued)

*Primary Examiner* — Noor Alkhateeb
(74) *Attorney, Agent, or Firm* — Dority & Manning, P.A.

(57) ABSTRACT

It is determined that an interpretable application including a plurality of files utilizes a runtime loaded external dependency that includes a plurality of functions. The runtime loaded external dependency includes executable software instructions that are loaded into the interpretable application during a runtime of the interpretable application in a web browser. A runtime dependency header module that contains information that identifies, for each function of the plurality of functions, a name of the function and a number of parameters of the function is obtained. The runtime dependency header module is stored in a location used by an interactive development environment (IDE) to determine dependencies used by the interpretable application for purposes of an autocompletion feature of the IDE.

18 Claims, 4 Drawing Sheets

(56) References Cited

U.S. PATENT DOCUMENTS

2021/0132913 A1\* 5/2021 Singh .................... G06F 8/33
2021/0173621 A1   6/2021 Fender et al.
2022/0114214 A1\* 4/2022 Reddymakireddy ..... G06F 8/38

OTHER PUBLICATIONS

Echarles, "How typesafe can a remote be with Typescript?" Issue #20, May 4, 2020, GitHub, https://github.com/module-federation/module-federation-examples/issues/20#issuecomment-847645348, 15 pages.

Garcia-Carmona, R. et al., "A Repository for Integration of Software Artifacts with Dependency Resolution and Federation Support," Communications in Computer and Information Science, vol. 303, Jan. 2013, pp. 166-180.

Hoque, M., "Ubiquitous Use of the Web Standards Model to Unify Web Application and Native Application Development Processes: A Practical Approach," Bachelor's Thesis, School of Business and Culture, Business Information Technology, Bachelor of Business Administration, 2017, 75 pages.

Saramud, M.V. et al., "A Tool for Developing and Verifying Components of Cross-Platform On-Board Software," International Journal on Information Technologies & Security, vol. 11, No. 1, 2019, pp. 13-20.

Author Unknown, "Module Federation," webpack, available as early as Jul. 2021, accessed Mar. 2022 from https://webpack.js.org/concepts/module-federation/, 7 pages.

Author Unknown, "Documentation—Introduction," TypeScript, available as early as Jul. 2021, accessed Mar. 2022 from https://www.typescriptlang.org/docs/handbook/declaration-files/introduction.html, 4 pages.

\* cited by examiner

DYNAMIC IMPORTATION OF EXTERNAL DEPENDENCY INFORMATION TO SUPPORT AUTOCOMPLETION IN AN INTERACTIVE DEVELOPMENT ENVIRONMENT

BACKGROUND

Interactive development environments (IDEs) often include an autocomplete feature that predicts, in response to the entry of one or more alphanumeric characters by a user, one or more keywords that the user may be beginning to enter in a user interface (UI) of the IDE. The IDE may immediately present the one or more keywords in the UI prior to the user typing additional alphanumeric characters to allow the user to select one of the keywords rather than require the user to enter the alphanumeric characters that make up the keyword. The autocomplete feature not only saves a software developer time, but reduces the likelihood of typographical errors.

SUMMARY

The examples disclosed herein implement dynamic importation of a runtime dependency header module to support autocompletion in interactive development environments.

In one example a method is provided. The method includes determining, by a computing device comprising a processor device, that an interpretable application including a plurality of files utilizes a runtime loaded external dependency including a first plurality of functions, the runtime loaded external dependency including executable software instructions that are loaded into the interpretable application during a runtime of the interpretable application in a web browser. The method further includes obtaining a runtime dependency header module that contains information that identifies, for each function of the first plurality of functions, a name of the function and a number of parameters of the function. The method further includes storing the runtime dependency header module in a location used by an interactive development environment (IDE) to determine dependencies used by the interpretable application for purposes of an autocompletion feature of the IDE.

In another example a computing device is provided. The computing device includes a memory and a processor device coupled to the memory. The processor device is to determine that an interpretable application including a plurality of files utilizes a runtime loaded external dependency including a first plurality of functions, the runtime loaded external dependency including executable software instructions that are loaded into the interpretable application during a runtime of the interpretable application in a web browser. The processor device is further to obtain a runtime dependency header module that contains information that identifies, for each function of the first plurality of functions, a name of the function and a number of parameters of the function. The processor device is further to store the runtime dependency header module in a location used by an interactive development environment (IDE) to determine dependencies used by the interpretable application for purposes of an autocompletion feature of the IDE.

In one example a non-transitory computer-readable storage medium is provided. The non-transitory computer-readable storage medium includes executable instructions to cause a processor device to determine that an interpretable application including a plurality of files utilizes a runtime loaded external dependency including a first plurality of functions, the runtime loaded external dependency including executable software instructions that are loaded into the interpretable application during a runtime of the interpretable application in a web browser. The instructions further cause the processor device to obtain a runtime dependency header module that contains information that identifies, for each function of the first plurality of functions, a name of the function and a number of parameters of the function. The instructions further cause the processor device to store the runtime dependency header module in a location used by an interactive development environment (IDE) to determine dependencies used by the interpretable application for purposes of an autocompletion feature of the IDE.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
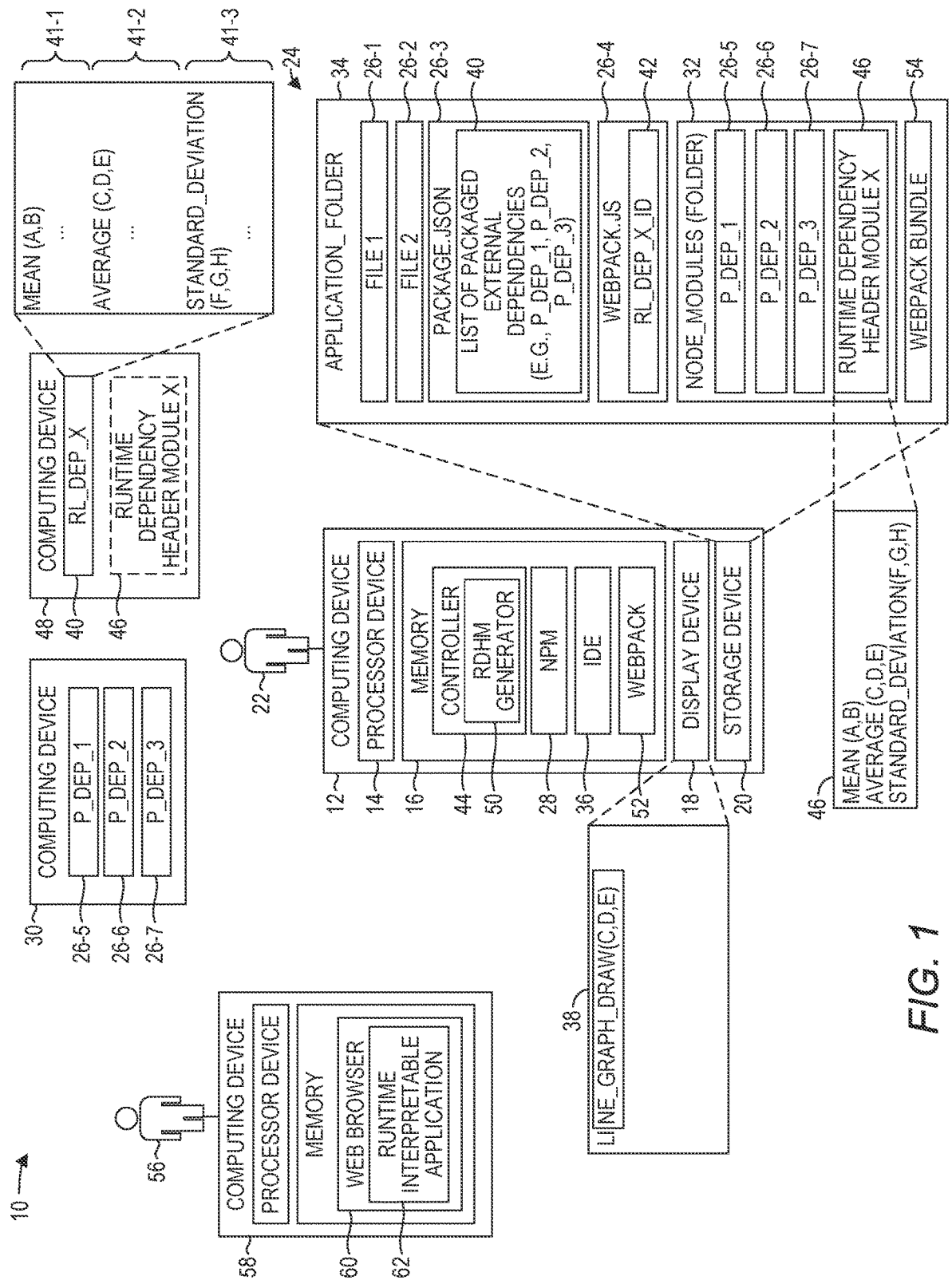
FIG. 1 is a block diagram of an environment in which dynamic importation of external dependency information to support autocompletion in an interactive development environment can be practiced according to one implementation.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Interactive development environments (IDEs) often include automated features that predict, in response to the entry of one or more alphanumeric characters by a user, such as a software developer, a particular keyword that the software developer may be attempting to enter in a user interface (UI) of the IDE. The IDE may immediately present, in the UI, information about the predicted keyword, such as the remaining characters of the keyword that have not been entered by the software developer, and where the predicted keyword is a function, additional information such as the parameters of the function, the types of the parameters, and the like. The IDE may allow the software developer to accept the predicted keyword via entry of a particular key, such as an arrow, space, or enter key, in lieu of manually entering the remainder of the keyword. Such automated features not only save a software developer time, but reduce the likelihood of a typographical error or, in the case of functions, incorrect parameter usage that may subsequently cause a runtime error when the function is invoked.

In order for the IDE to provide such automated services, the IDE must know what keywords the software developer may attempt to enter in the UI. In a Javascript application, such keywords may include functions that are identified in the Javascript source code files and may include functions in external dependencies that are incorporated into the Javascript application at package build time (sometimes referred to herein as "packaged external dependencies"). In some examples, a software developer may initiate a package manager such as node package manager (NPM) (www.npmjs.com) to cause the package manager to analyze the Javascript application and download such external dependencies to a predetermined location, such as a local node_modules folder prior to initiating the IDE. The software developer may then initiate the IDE.

The IDE accesses the predetermined location, in this example the local node_modules folder, examines the external dependencies located in the node_modules folder, and generates information gleaned from such external dependencies, such as function names, number of parameters for each function, types of parameters, and the like. The IDE may then use such information to provide autocomplete and other related functionality, such as the presentation of the number of parameters and types of parameters to the software developer in the UI in real-time.

Another external dependency type is an external dependency that is not packaged with the Javascript application, but instead, is loaded into the Javascript application at runtime. Such external dependencies may be referred to herein as runtime loaded external dependencies to distinguish such external dependencies from packaged external dependencies. One example of such runtime loaded external dependencies are federated modules implemented via Webpack (www.webpack.js.org). Although a runtime loaded external dependency is identified in the Javascript application at build time, the runtime loaded external dependency is not loaded into the Javascript application until the Javascript application executes in a web browser. One advantage of a runtime loaded external dependency over a packaged external dependency is that, each time the Javascript application executes, the most recent version of the runtime loaded external dependency is loaded at runtime.

A runtime loaded external dependency may comprise a plurality of functions that may be called by an interpretable application such as a Javascript application. As an example, a Javascript application may perform statistical analysis of data. The Javascript application may utilize a runtime loaded external dependency that comprises statistical analysis functions, such as a function to sum numbers, a function to find a mean of a list of numbers, a function to find an average of a list of numbers, a function to generate a standard deviation curve given a list of numbers, and the like. The Javascript application may include function invocations to such functions even though the runtime loaded external dependency is not packaged with the Javascript application, and may not even be available to the Javascript application during development of the Javascript application.

Because a runtime loaded external dependency is not downloaded, packaged, and distributed with the Javascript application, an IDE has no knowledge of a runtime loaded external dependency that is used by a Javascript application. While developing the Javascript application, a software developer may enter the name of a function contained in the runtime loaded external dependency, and the IDE is unaware of the existence of the function. Thus, the name of the function is not a known keyword to the IDE, and the IDE cannot provide autocomplete or other automated features that might be helpful to the software developer. This greatly increases the likelihood that the software developer will enter the function name incorrectly, and/or provide an incorrect number of, or type of, parameters to the function. Such errors may not be discovered until the Javascript application has been bundled and distributed and is executing in a web browser. At that time, the runtime loaded external dependency will be loaded into the Javascript application, and the attempted invocation of an incorrect function name, or an attempt to invoke a function using incorrect parameters, will cause a runtime error.

The examples disclosed herein implement dynamic importation of a runtime dependency header module to support autocompletion in interactive development environments. The examples determine that an interpretable application, such as a Javascript application, utilizes a runtime loaded external dependency. A runtime dependency header module that contains information that identifies the function names of the runtime loaded external dependency and parameter information of the functions is obtained. The runtime dependency header module is stored in a location used by a downstream IDE to determine dependencies used by the interpretable application for autocompletion purposes.

The software developer may then use the IDE to modify the interpretable application, and the IDE can provide autocomplete features for the packaged external dependencies and the runtime loaded external dependencies. Subsequent to initiating the IDE, the examples disclosed herein access the Javascript application and remove the runtime dependency header module from the predetermined location so the runtime dependency header module is not packaged with the Javascript application.

FIG. 1 is a block diagram of an environment 10 in which dynamic importation of external dependency information to support autocompletion in an interactive development environment can be practiced according to one implementation. The environment 10 includes a computing device 12, which in turn includes a processor device 14, a memory 16, and a display device 18. The computing device 12 includes, or is otherwise communicatively coupled to, a storage device 20. A user, such as a software developer 22, interacts with the computing device 12 to generate and distribute an interpretable application 24 that comprises a plurality of files 26-1-26-7 (generally, files 26). The term "interpretable application" as used herein refers to an application that is interpreted at runtime and comprises executable instructions in a form other than binary executable code that can be executed natively on a processor device. In this example, the interpretable application 24 comprises a Javascript application, and in particular, a node.js Javascript application having a client portion that runs in a web browser.

The development process of the interpretable application 24 may be iterative. The software developer 22 may initially, for example, initiate an NPM 28 to generate a "skeletal" interpretable application 24 that contains core packaged external dependencies, such as packaged external dependencies 26-5 and 26-6. The NPM 28 is a node package manager available at www.npmjs.com. The term "external dependency" as used herein refers to a software package that includes one or more functions that may be invoked directly or indirectly by interpretable instructions, such as Javascript instructions, of the interpretable application 24. External dependencies are widely used because they implement commonly used functions and eliminate the need for a software developer to separately program a particular function, test the function and debug the function. For example, the external dependency 26-5 may comprise a graphics package that provides functions that, when invoked, cause a desired graphical function to be implemented, such as the drawing of a bar graph, a line graph, a pie chart, or the like. The external dependency 26-6 may provide constraint solving functions which, which invoked, solve constraint problems. The external dependencies may be available from a third-party entity or repository such as a computing device 30.

The "skeletal" interpretable application 24 may include a package.json file 26-3 that is a configuration file that identifies the packaged external dependencies 26-5 and 26-6. The NPM 28 may, in response to an instruction or by default, automatically download identified packaged external dependencies that are identified in the package.json file 26-3 to a determined location. In this example, because the package.json file 26-3 identifies the external dependencies 26-5 and 26-6, the NPM 28 downloads the external dependencies 26-5 and 26-6 from the computing device 30 to a node_modules folder 32. The node_modules folder 32 is a sub-folder of an application folder 34 in which the interpretable application 24 is stored. The external dependencies 26-5 and 26-6 contain the actual software instructions that, when invoked, implement the desired functionality.

The software developer 22 may then initiate an interactive development environment (IDE) 36 to modify the interpretable application 24. The IDE 36 is a software development package that facilitates and eases software development for the software developer 22. In some implementations, the IDE 36 may comprise the Microsoft® Studio® IDE. The software developer 22 enters information that identifies the interpretable application 24. The IDE 36, by default, may search the node_modules folder 32 to determine if the interpretable application 24 utilizes any external dependencies. In this example, at this point in time, the IDE 36 determines that the node_modules folder 32 includes the external dependencies 26-5 and 26-6. The IDE 36 loads information about the external dependencies 26-5 and 26-6 for use in providing the software developer 22 autocomplete features. The information may include, by way of non-limiting example, function names of the functions contained in the external dependencies 26-5 and 26-6, the number of parameters of each such function, types of parameters of each such function, variable and constant names contained in the external dependencies 26-5 and 26-6, and any other information that may be useful to facilitate software development by the software developer 22.

The term "autocomplete" as used herein refers to automated activities of the IDE 36 that ease the development of the interpretable application 24 by automatically providing, to the software developer 22, information in response to determining, or predicting, that keystrokes of the software developer 22 match or may match known keywords. As an example, a function name of a function contained in the packaged external dependency 26-5 may be "Line_Graph_Draw" and may require three parameters. In response to the entry of the keys "L" and "i" into a UI 38, the IDE 36 may predict that the software developer 22 may be entering the function name Line_Graph_Draw and may automatically present the letters "ne_Graph_Draw" in the UI 38 along with information that indicates that the function Line_Graph_Draw requires three parameters. The software developer 22 may then accept the predicted keyword via entry of a particular key, such as an arrow, space, or enter key, in lieu of manually entering the remainder of the keyword. Such automated features not only save a software developer time, but reduce the likelihood of a typographical error or, in the case of functions, incorrect parameter usage that may subsequently cause a runtime error in a web browser when the function is invoked by the interpretable application 24.

The software developer 22 may use the IDE 36 to generate or modify one or more Javascript files 26-1 and 26-2 which contain interpretable instructions that invoke functions contained in the packaged external dependencies 26-5-26-6. The software developer 22 may determine that a third packaged external dependency 26-7 will be needed. The software developer 22 may modify the package.json file 26-3 to identify the packaged external dependency 26-7, and then initiate, or cause to be initiated, the NPM 28. The NPM 28 accesses the package.json file 26-3, determines that an additional packaged external dependency 26-7 has been added to the package.json file 26-3, and downloads the packaged external dependency 26-7 from the computing device 30 to the node_modules folder 32. The software developer 22 may then again initiate the IDE 36. The IDE 36 searches the node_modules folder 32 to determine if the interpretable application 24 utilizes any external dependencies. In this example, at this point in time, the IDE 36 determines that the node_modules folder 32 includes the external dependencies 26-5, 26-6, and 26-7. The IDE 36 loads information about the external dependencies 26-5-26-7 for use in providing, to the software developer 22, autocomplete features. This process may be iterated multiple times as the software developer 22 develops the interpretable application 24.

The software developer 22 determines that the interpretable application 24 will utilize a runtime loaded external dependency 40 that implements a plurality of statistics functions 41-1-41-3 (generally, functions 41), such as Mean, Average, Standard_Deviation statistics functions, and the like. The term "runtime loaded external dependency" as used herein refers to an external dependency type that is not packaged and distributed with the Javascript application but, instead, is loaded into the Javascript application at runtime when the interpretable application 24 is executing in a web browser. One example of such runtime loaded external dependencies are federated modules implemented via Webpack (webpack.js.org). Thus, in some implementations, the runtime loaded external dependency 40 comprises a webpack federated module.

In this example, the software developer 22 generates or modifies a webpack.js file 26-4 which is a webpack configuration file to include a runtime loaded external dependency identifier 42 that identifies the runtime loaded external dependency 40. This information is used by the webpack technology to implement the runtime loaded external dependency 40. Because the runtime loaded external dependency 40 is not packaged and distributed with the interpretable application 24, the NPM 28 does not download the runtime loaded external dependency 40 to the node_modules folder 32. Because the runtime loaded external dependency 40 is not contained in the node_modules folder 32, the IDE 36 is not aware of the content of the runtime loaded external dependency 40, such as the function names or parameters used by the functions 41 contained in the runtime loaded external dependency 40. Thus, the IDE 36 is not able to provide any autocomplete functionality to the software developer 22 regarding the runtime loaded external dependency 40. If the software developer 22 begins typing into the UI 38 the letters "Stand", the IDE 36 is not able to predict that the software developer 22 may be typing in the function name "Standard_Deviation". If the software developer 22 incorrectly modifies the Javascript file 26-1 to invoke a "Standerd_Deviation" function instead of the "Standard_Deviation" function 41-3, the IDE 36 can provide no indication that a "Standerd_Deviation" function does not exist. Instead, subsequently, at runtime in a browser, when the interpretable application attempts to invoke a "Standerd_Deviation" function, the invocation will not be resolved because the runtime loaded external dependency 40 does not contain a "Standerd_Deviation" function, and a runtime error will occur.

The examples disclosed herein implement dynamic importation of external dependency information to support autocompletion in interactive development environments. The features discussed herein will be described as implemented via a standalone controller 44. However, the controller 44, in other implementations, may be incorporated into the NPM 28 and/or the IDE 36.

In this example, after the software developer 22 generates or modifies the webpack.js file 26-4 to include the runtime loaded external dependency identifier 42 that identifies the runtime loaded external dependency 40, the software developer 22 may initiate the controller 44 with a particular command, such as "enable". The controller 44 determines that the interpretable application 24 utilizes the runtime loaded external dependency 40 based on the runtime loaded external dependency identifier 42. The controller 44 obtains a runtime dependency header module 46 that contains information that identifies, for each function 41 in the runtime loaded external dependency 40, a name of the function 41 and a number of parameters of the function 41. The runtime dependency header module 46 does not contain the actual executable instructions of the runtime loaded external dependency 40, but contains information that identifies the function names contained in the runtime loaded external dependency 40 and the parameters used by such functions 41. The controller 44 then stores the runtime dependency header module 46 in the node_modules folder 32.

The software developer 22 may then initiate the IDE 36. The IDE 36 searches the node_modules folder 32 to determine if the interpretable application 24 utilizes any external dependencies. In this example, at this point in time, the IDE 36 determines that the node_modules folder 32 includes the external dependencies 26-5-26-7 and the runtime dependency header module 46. The runtime dependency header module 46 is in a format and has a syntax such that the IDE 36 reads the runtime dependency header module 46 and generates information suitable to implement autocomplete features for not only the packaged external dependencies 26-5-26-7 but also for the runtime loaded external dependency 40. Thus, if the software developer 22 begins to enter the letters "Stan", the IDE 36 may predict that the software developer 22 intends to enter the name of the function Standard_Deviation, and may automatically present the remaining letters "dard_Deviation" in the UI 38 along with information that indicates that the function Standard_Deviation requires three parameters, and thus prevent the software developer 22 from inadvertently entering the letters "Standerd_Deviation", thereby eliminating a subsequent runtime error when the interpretable application 24 is executed in a web browser.

The controller 44 may obtain the runtime dependency header module 46 in any number of ways. In some implementations, developers of runtime loaded external dependencies may generate corresponding runtime dependency header modules, and store the runtime dependency header modules along with the runtime loaded external dependencies. For instance, in this example, the controller 44 may determine the location of the runtime loaded external dependency 40 from the runtime loaded external dependency identifier 42. The controller 44 may then access the location of the runtime loaded external dependency 40, such as, in this example, a computing device 48, and determine that the runtime dependency header module 46 is stored on the computing device 48, and may then download the runtime dependency header module 46 from the computing device 48 to the node_modules folder 32. In other implementations, developers of runtime loaded external dependencies may generate and store corresponding runtime dependency header modules in a determined location, such as a public runtime dependency header module repository. The controller 44 may then access such public runtime dependency header module repository to download the runtime dependency header modules for runtime loaded external dependencies used in a particular interpretable application.

In another implementation, the runtime dependency header module (RDHM) generator 50 may, in real time, generate a runtime dependency header module. For example, the RDHM generator 50 may access the runtime loaded external dependency 40 and parse the contents of the runtime loaded external dependency 40 to identify the plurality of functions contained in the runtime loaded external dependency 40, and, for each respective function 41 of the plurality of functions 41, store, in the runtime dependency header module 46, the name of the respective function 41 and the number of parameters of the respective function 41 in a particular format and/or syntax understood by the IDE 36.

After the software developer 22 completes the development of the interpretable application 24, the software developer 22 may again initiate the controller 44 with a command, such as "disable". The controller 44 then removes the runtime dependency header module 46 from the node_modules folder 32. This is to prevent the runtime dependency header module 46 from subsequently being bundled with the interpretable application 24 when the interpretable application 24 is bundled for distribution.

The software developer 22 may then use, for example, a webpack 52 to bundle the interpretable application 24 into a webpack Javascript application bundle 54 for distribution. The webpack Javascript application bundle 54 includes content from one or more of the files 26-1-26-7 necessary for the interpretable application 24 to execute in a web browser, including the packaged external dependencies 26-5-26-7, but does not include the runtime loaded external dependency 40 or the runtime dependency header module 46, because the runtime loaded external dependency 40 will be loaded at runtime of the interpretable application 24 when executing in a web browser.

Subsequently, a user 56 may manipulate a computing device 58 to cause a webpage containing a reference to the interpretable application 24 to be downloaded into a web browser 60. The web browser 60 receives a runtime interpretable application 62 that includes the packaged external dependencies 26-5, 26-6, and 26-7. The runtime interpretable application 62 does not initially include the runtime loaded external dependency 40. At some point during the execution of the runtime interpretable application 62, the web browser 60 obtains the runtime loaded external dependency 40, and function and parameter resolution occurs.

While solely for purposes of illustration and ease of understanding the controller 44 has been illustrated as a standalone component, in other implementations, the controller 44 may be implemented in the NPM 28, and the NPM 28 may automatically examine the interpretable application 24 to determine if the runtime loaded external dependency identifier 42 exists in the webpack.js file 26-4. If so, the NPM 28 may automatically perform the functionality attributed to the controller 44 above. In yet another implementation, the controller 44 may be implemented in the IDE 36. The IDE 36 may automatically examine the interpretable application 24 to determine if the runtime loaded external dependency identifier 42 exists in the webpack.js file 26-4. If so, the IDE 36 may automatically perform the functionality attributed to the controller 44 above.

Moreover, because the controller 44 is a component of the computing device 12, functionality implemented by the controller 44 may be attributed to the computing device 12 generally. Moreover, in examples where the controller 44 comprises software instructions that program a processor device to carry out functionality discussed herein, functionality implemented by the controller 44 may be attributed herein to the processor device 14 of the computing device 12.

Figure 2:
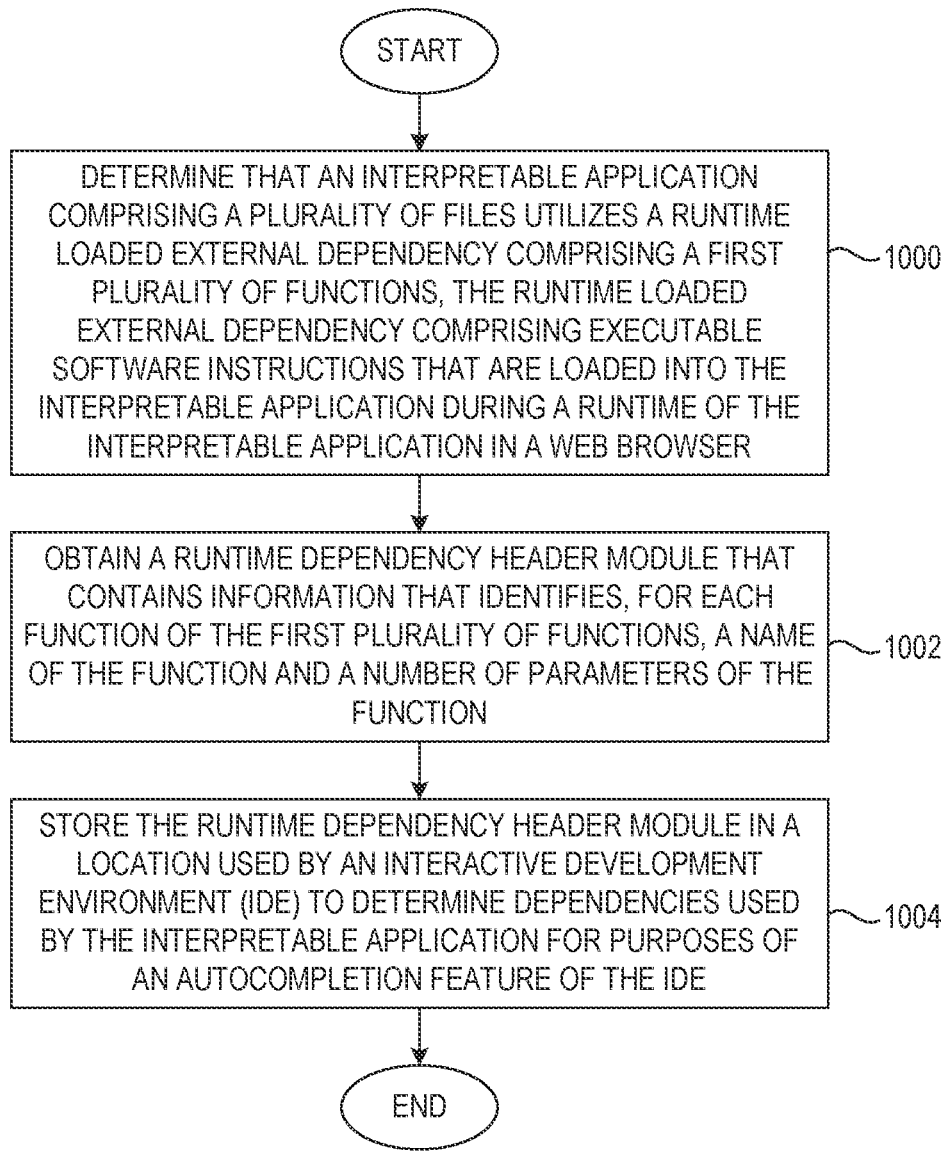
FIG. 2 is a flowchart of a method for dynamic importation of external dependency information to support autocompletion in an interactive development environment according to one implementation.

FIG. 2 is a flowchart of a method for dynamic importation of external dependency information to support autocompletion in an interactive development environment according to one implementation. FIG. 2 will be discussed in conjunction with FIG. 1. The computing device 12 determines that the interpretable application 24 comprising the plurality of files 26 utilizes the runtime loaded external dependency 40 comprising a plurality of functions, the runtime loaded external dependency 40 comprising executable software instructions that are loaded into the interpretable application 24 during a runtime of the interpretable application 24 in the web browser 60 (FIG. 2, block 1000). The computing device 12 obtains the runtime dependency header module 46 that contains information that identifies, for each function 41 of the first plurality of functions 41, a name of the function 41 and a number of parameters of the function 41 (FIG. 2, block 1002). The computing device 12 stores the runtime dependency header module 46 in a location used by the IDE 36 to determine dependencies used by the interpretable application 24 for purposes of an autocompletion feature of the IDE 36 (FIG. 2, block 1004).

Figure 3:
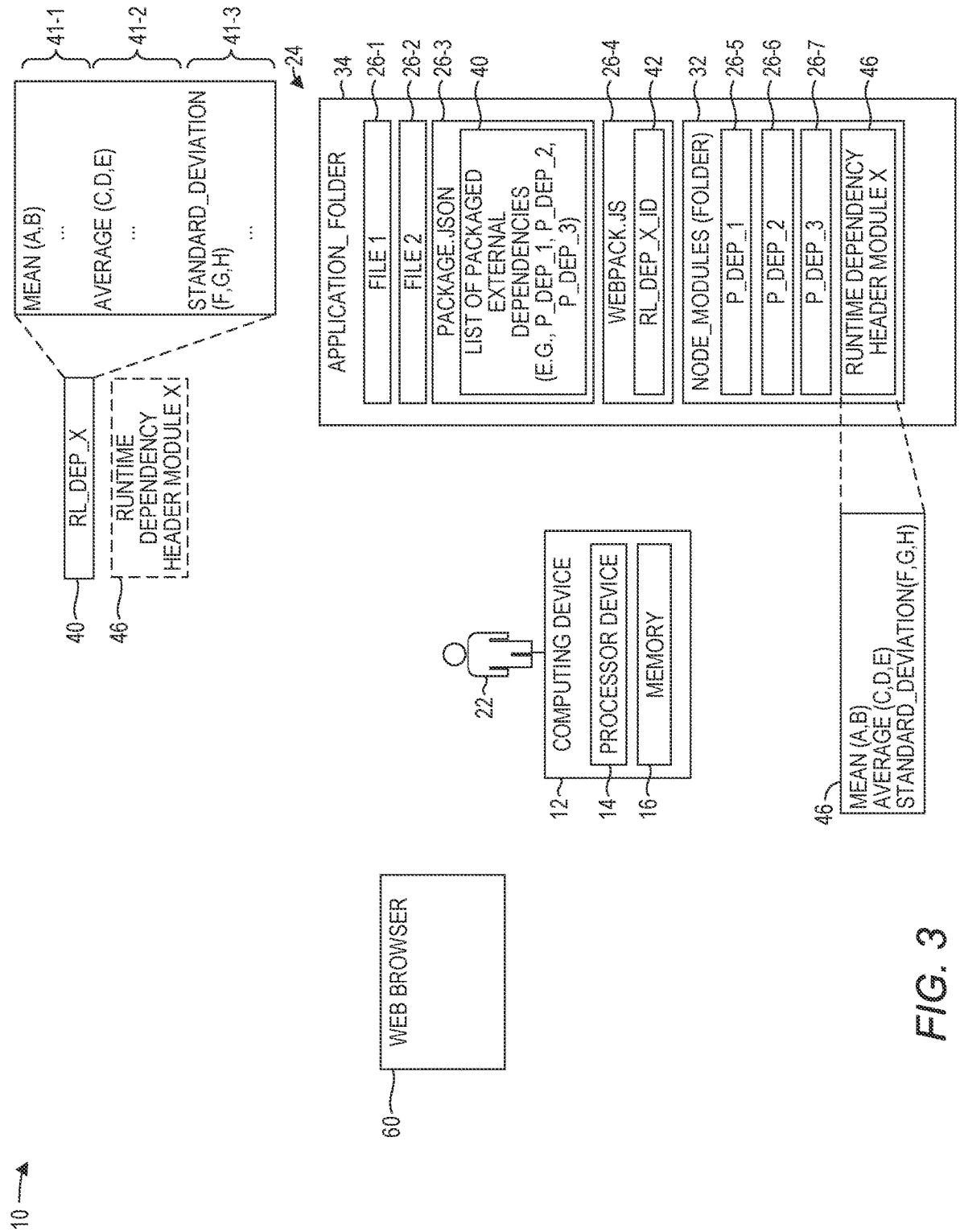
FIG. 3 is a simplified block diagram of the environment illustrated in FIG. 1 according to one implementation.

FIG. 3 is a simplified block diagram of the environment 10 illustrated in FIG. 1 according to one implementation. The environment 10 includes the computing device 12, which includes the memory 16 and the processor device 14. The processor device 14 is coupled to the memory 16 and is to determine that the interpretable application 24 comprising the plurality of files 26 utilizes the runtime loaded external dependency 40 comprising the plurality of functions 41. The runtime loaded external dependency 40 includes executable software instructions that are loaded into the interpretable application 24 during a runtime of the interpretable application 24 in the web browser 60. The processor device 14 is further to obtain the runtime dependency header module 46 that contains information that identifies, for each function 41, a name of the function 41 and a number of parameters of the function 41. The processor device 14 is further to store the runtime dependency header module 46 in a location used by the IDE 36 to determine dependencies used by the interpretable application 24 for purposes of an autocompletion feature of the IDE 36.

Figure 4:
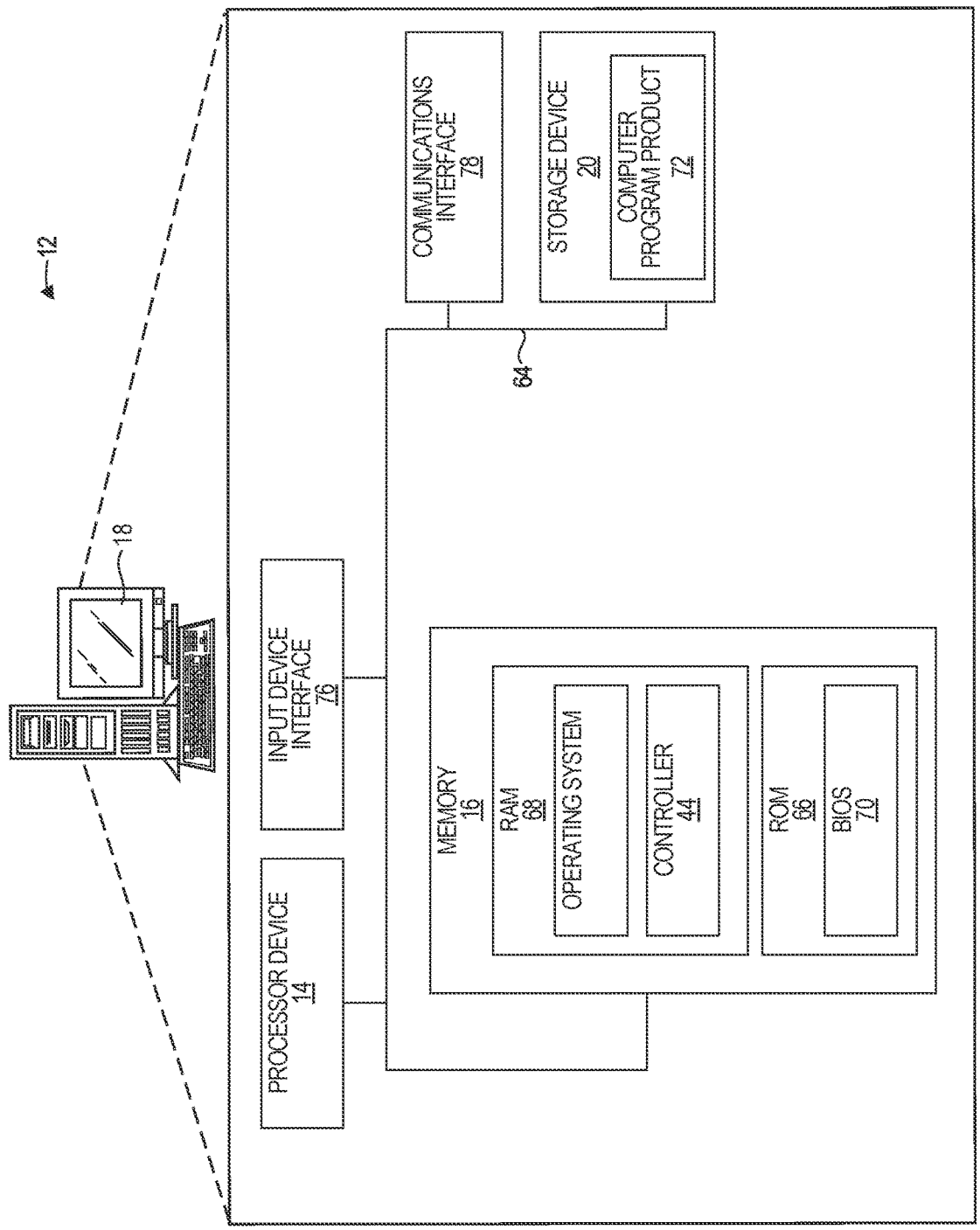
FIG. 4 is a block diagram of a computing device suitable for implementing examples according to one example.

FIG. 4 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 12 includes the processor device 14, the memory 16, and a system bus 64. The system bus 64 provides an interface for system components including, but not limited to, the memory 16 and the processor device 14. The processor device 14 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The memory 16 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing device 12. The volatile memory 68 may also include a high-speed RAM, such as static RAM, for caching data.

The computing device 12 may further include or be coupled to a non-transitory computer-readable storage medium such as the storage device 20, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 20 and other drives associated with computer-readable media and computer-usable media may provide non-volatile storage of data, data structures, computer-executable instructions, and the like.

A number of modules can be stored in the storage device 20 and in the volatile memory 68, including an operating system and one or more program modules, such as the controller 44, which may implement the functionality described herein in whole or in part. All or a portion of the examples may be implemented as a computer program product 72 stored on a transitory or non-transitory computer-usable or computer-readable storage medium, such as the storage device 20, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the controller 44 in the volatile memory 68, may serve as a controller, or control system, for the computing device 12 that is to implement the functionality described herein.

An operator, such as the software developer 22, may also be able to enter one or more configuration commands through a keyboard (not illustrated), a pointing device such as a mouse (not illustrated), or a touch-sensitive surface such as the display device 18. Such input devices may be connected to the processor device 14 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 78 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
accessing, by a computing system comprising one or more computing devices and further comprising an interactive development environment (IDE), the IDE modifying an interpretable application comprising a plurality of files, a first file that identifies a runtime loaded external dependency comprising a first plurality of functions, the runtime loaded external dependency comprising executable software instructions that are loaded into the interpretable application during a runtime of the interpretable application in a web browser;
storing, by the computing system based on the first file that identifies the runtime loaded external dependency, a second file that contains information that identifies, for each function of the first plurality of functions, a name of the function and a number of parameters of the function in a folder used by the IDE to determine dependencies used by the interpretable application for purposes of an autocompletion feature of the IDE and used by an application bundler to retrieve packaged external dependencies to include in an application bundle, wherein the second file is not one of the plurality of files;
subsequent to storing the second file in the folder, performing, by the computing system using the IDE, an autocompletion action comprising:
receiving, by the IDE from a user, one or more keystrokes;
displaying, by the IDE to the user based at least in part on the second file and based at least in part on the one or more keystrokes, an autocompletion output comprising at least a portion of a name of a first function of the first plurality of functions of the runtime loaded external dependency; and
adding, by the IDE based on a user input associated with the autocompletion output, the name of the first function of the first plurality of functions of the runtime loaded external dependency to a source code file of the plurality of files of the interpretable application; and subsequent to storing the second file in the folder, bundling, by the computing system using the application bundler, the interpretable application for distribution, wherein bundling the interpretable application comprises removing the second file from the folder before bundling any remaining files located in the folder such that the second file is omitted from the interpretable application.

2. The method of claim 1 wherein the interpretable application comprises a node.js Javascript application.

3. The method of claim 1 wherein the plurality of files comprises at least one packaged external dependency comprising a second plurality of functions.

4. The method of claim 1 wherein the folder comprises a local node_modules folder.

5. The method of claim 1 wherein the runtime loaded external dependency comprises a webpack federated module.

6. The method of claim 1 wherein the first file is a configuration file of the plurality of files.

7. The method of claim 6 wherein the configuration file comprises a webpack configuration file.

8. The method of claim 1 wherein the interpretable application comprises a Javascript application, and wherein bundling the interpretable application comprises:
subsequent to storing the second file in the folder, generating a webpack Javascript application bundle of the Javascript application for distribution, and omitting the second file from the webpack Javascript application bundle.

9. The method of claim 1, further comprising:
accessing the runtime loaded external dependency; and
parsing contents of the runtime loaded external dependency to identify the first plurality of functions, and, for each function of the first plurality of functions, storing, in the second file, the name of the function and the number of parameters of the function.

10. A computing device, comprising:
a memory;
an interactive development environment (IDE), the IDE modifying an interpretable application comprising a plurality of files; and
a processor device coupled to the memory to:
access a first file that identifies a runtime loaded external dependency comprising a first plurality of functions, the runtime loaded external dependency comprising executable software instructions that are loaded into the interpretable application during a runtime of the interpretable application in a web browser;
store, based on the first file that identifies the runtime loaded external dependency, a second file that contains information that identifies, for each function of the first plurality of functions, a name of the function and a number of parameters of the function in a folder used by the IDE to determine dependencies used by the interpretable application for purposes of an autocompletion feature of the IDE and used by an application bundler to retrieve packaged external dependencies to include in an application bundle, wherein the second file is not one of the plurality of files;
subsequent to storing the second file in the folder, perform, using the IDE, an autocompletion action, wherein to perform the autocompletion action, the processor device is further to:

receive, by the IDE from a user, one or more keystrokes;

display, by the IDE to the user based at least in part on the second file and based at least in part on the one or more keystrokes, an autocompletion output comprising at least a portion of a name of a first function of the first plurality of functions of the runtime loaded external dependency; and add, by the IDE based on a user input associated with the autocompletion output, the name of the first function of the first plurality of functions of the runtime loaded external dependency to a source code file of the plurality of files of the interpretable application; and subsequent to storing the second file in the folder, bundle, using the application bundler, the interpretable application for distribution, wherein bundling the interpretable application comprises removing the second file from the folder before bundling any remaining files located in the folder such that the second file is omitted from the interpretable application.

11. The computing device of claim 10 wherein the interpretable application comprises a node.js Javascript application.

12. The computing device of claim 10 wherein the plurality of files comprises at least one packaged external dependency comprising a second plurality of functions.

13. The computing device of claim 10 wherein the first file is a configuration file of the plurality of files.

14. The computing device of claim 10 wherein the processor device is further to:

access the runtime loaded external dependency; and parse contents of the runtime loaded external dependency to identify the first plurality of functions, and, for each function of the first plurality of functions, store, in the second file, the name of the function and the number of parameters of the function.

15. A non-transitory computer-readable storage medium that includes executable instructions to cause a processor device to:

access a first file that identifies a runtime loaded external dependency comprising a first plurality of functions, the runtime loaded external dependency comprising executable software instructions that are loaded into an interpretable application comprising a plurality of files during a runtime of the interpretable application in a web browser;

store, based on the first file that identifies the runtime loaded external dependency, a second file that contains information that identifies, for each function of the first plurality of functions, a name of the function and a number of parameters of the function in a folder used by an interactive development environment (IDE) modifying the interpretable application to determine dependencies used by the interpretable application for purposes of an autocompletion feature of the IDE and used by an application bundler to retrieve packaged external dependencies to include in an application bundle, wherein the second file is not one of the plurality of files;

subsequent to storing the second file in the folder, perform, using the IDE, an autocompletion action, wherein to perform the autocompletion action, the instructions further cause the processor device to:

receive, by the IDE from a user, one or more keystrokes;

display, by the IDE to the user based at least in part on the second file and based at least in part on the one or more keystrokes, an autocompletion output comprising at least a portion of a name of a first function of the first plurality of functions of the runtime loaded external dependency; and add, by the IDE based on a user input associated with the autocompletion output, the name of the first function of the first plurality of functions of the runtime loaded external dependency to a source code file of the plurality of files of the interpretable application; and subsequent to storing the second file in the folder, bundle, by the processor device using the application bundler, the interpretable application for distribution, wherein bundling the interpretable application comprises removing the second file from the folder before bundling any remaining files located in the folder such that the second file is omitted from the interpretable application.

16. The non-transitory computer-readable storage medium of claim 15 wherein the plurality of files comprises at least one packaged external dependency comprising a second plurality of functions.

17. The non-transitory computer-readable storage medium of claim 15 wherein the first file is a configuration file of the plurality of files.

18. The non-transitory computer-readable storage medium of claim 15 wherein the instructions further cause the processor device to:

access the runtime loaded external dependency; and parse contents of the runtime loaded external dependency to identify the first plurality of functions, and, for each function of the first plurality of functions, store, in the second file, the name of the function and the number of parameters of the function.

* * * * *